United States Patent
Ren

(10) Patent No.: US 12,266,934 B2
(45) Date of Patent: Apr. 1, 2025

(54) DEMAND RESPONSE OF LOADS HAVING THERMAL RESERVES

(71) Applicant: Eaton Intelligent Power Limited, Dublin (IE)

(72) Inventor: Wei Ren, Plymouth, MN (US)

(73) Assignee: Eaton Intelligent Power Limited, Dublin (IE)

(*) Notice: Subject to any disclaimer, the term of this patent is extended or adjusted under 35 U.S.C. 154(b) by 461 days.

(21) Appl. No.: 17/624,155

(22) PCT Filed: Jul. 2, 2020

(86) PCT No.: PCT/EP2020/025314
§ 371 (c)(1),
(2) Date: Dec. 30, 2021

(87) PCT Pub. No.: WO2021/001060
PCT Pub. Date: Jan. 7, 2021

(65) Prior Publication Data
US 2022/0352717 A1     Nov. 3, 2022

Related U.S. Application Data

(60) Provisional application No. 62/870,159, filed on Jul. 3, 2019.

(51) Int. Cl.
*H02J 3/14* (2006.01)
*H02J 3/00* (2006.01)

(52) U.S. Cl.
CPC ............ *H02J 3/14* (2013.01); *H02J 3/003* (2020.01)

(58) Field of Classification Search
CPC .... H02J 3/14; H02J 3/003; H02J 3/381; H02J 13/00028; H02J 2300/24; H02J 2310/10;
(Continued)

(56) References Cited

U.S. PATENT DOCUMENTS 8,204,633 B2   6/2012   Harbin et al.
8,720,791 B2   5/2014   Slingsby et al.
(Continued)

FOREIGN PATENT DOCUMENTS

CN    104482654 A    4/2015
EP    3457513 A1    3/2019
(Continued)

OTHER PUBLICATIONS

Yoon, J.H., Bladick, R. and Novoselac, A., 2014. Demand response for residential buildings based on dynamic price of electricity. Energy and Buildings, 80, pp. 531-541. (Year: 2014).*
(Continued)

*Primary Examiner* — Alicia M. Choi
(74) *Attorney, Agent, or Firm* — DiBerardino McGovern IP Group LLC

(57) ABSTRACT

Systems and methods are described herein that improve grid performance by smoothing demand using thermal reserves. The smoothed demand can reduce peak loads as well as the ramp rate of demand that will otherwise require the use of inefficient, expensive generation sources. These improvements are tied to the selective switching on or off electrical loads that are coupled to thermal reserves, effectively using the thermal reserves as an energy storage mechanism. Historical data of past usage can be used to create load model and ensure that effects on customer comfort are minimized while still accomplishing the beneficial effects for the overall grid, which enables grid owners to both reduce their operational cost by avoiding expensive generation and improve system reliability by achieving more predictable power demand.

20 Claims, 12 Drawing Sheets

(58) Field of Classification Search
CPC ...... H02J 2310/60; H02J 2310/64; H02J 3/28; H02J 3/00; F24H 1/185; F24H 7/002; Y04S 50/10; G06Q 10/04; G06Q 50/06
See application file for complete search history.

(56) References Cited

U.S. PATENT DOCUMENTS

| | | | |
|---|---|---|---|
| 9,236,737 | B1 | 1/2016 | Moan et al. |
| 9,461,470 | B2 | 10/2016 | Cox et al. |
| 9,528,717 | B2 | 12/2016 | Childs et al. |
| 9,927,131 | B2 | 3/2018 | Rognli et al. |
| 11,435,772 | B2 * | 9/2022 | Gupta .................. G05B 15/02 |
| 2004/0034484 | A1 | 2/2004 | Solomita et al. |
| 2009/0187499 | A1 | 7/2009 | Mulder et al. |
| 2010/0145884 | A1 * | 6/2010 | Paik ........................ H04L 12/10 |
| | | | 700/286 |
| 2011/0066300 | A1 | 3/2011 | Tyagi et al. |
| 2011/0123179 | A1 | 5/2011 | Roetker et al. |
| 2012/0016524 | A1 | 1/2012 | Spicer et al. |
| 2012/0055419 | A1 | 3/2012 | Beyerle et al. |
| 2013/0125572 | A1 | 5/2013 | Childs et al. |
| 2014/0277761 | A1 | 9/2014 | Matsuoka et al. |
| 2015/0170171 | A1 | 6/2015 | McCurnin et al. |
| 2015/0248118 | A1 | 9/2015 | Li et al. |
| 2015/0253027 | A1 | 9/2015 | Lu et al. |
| 2016/0042377 | A1 * | 2/2016 | Ilic .......................... G06Q 50/06 |
| | | | 705/7.35 |
| 2016/0091904 | A1 | 3/2016 | Horesh et al. |
| 2016/0178239 | A1 | 6/2016 | Thornton et al. |
| 2017/0102165 | A1 | 4/2017 | Brekken et al. |
| 2017/0250539 | A1 * | 8/2017 | Feng .................. H02J 13/00026 |
| 2018/0068398 | A1 | 3/2018 | Yeung |
| 2018/0314220 | A1 * | 11/2018 | Kumar .................. G05B 19/042 |
| 2018/0328794 | A1 * | 11/2018 | Hoff ........................ G01R 21/02 |
| 2018/0357577 | A1 * | 12/2018 | ElBsat ...................... H02J 3/14 |
| 2019/0312429 | A1 * | 10/2019 | Vitullo ................... G05B 13/04 |
| 2022/0042704 | A1 * | 2/2022 | Drees ................... G05B 19/406 |

FOREIGN PATENT DOCUMENTS

| | | |
|---|---|---|
| WO | 2012162646 A1 | 11/2012 |
| WO | 2017062896 A1 | 4/2017 |

OTHER PUBLICATIONS

Tang, R. and Wang, S., 2019. Model predictive control for thermal energy storage and thermal comfort optimization of building demand response in smart grids. Applied Energy, 242, pp. 873-882. (Year: 2019).*

Yukon Enterprise Software Platform, "Flexible. Scalable. Configurable. The Power of the Platform.", Publication No. SA10006EN / GG, Eaton, Jun. 2018, 2 pages.

European International Searching Authority, International Search Report and Written Opinion, counterpart PCT Application No. PCT/EP2020/025314, mailed Dec. 14, 2020, 16 pages.

* cited by examiner

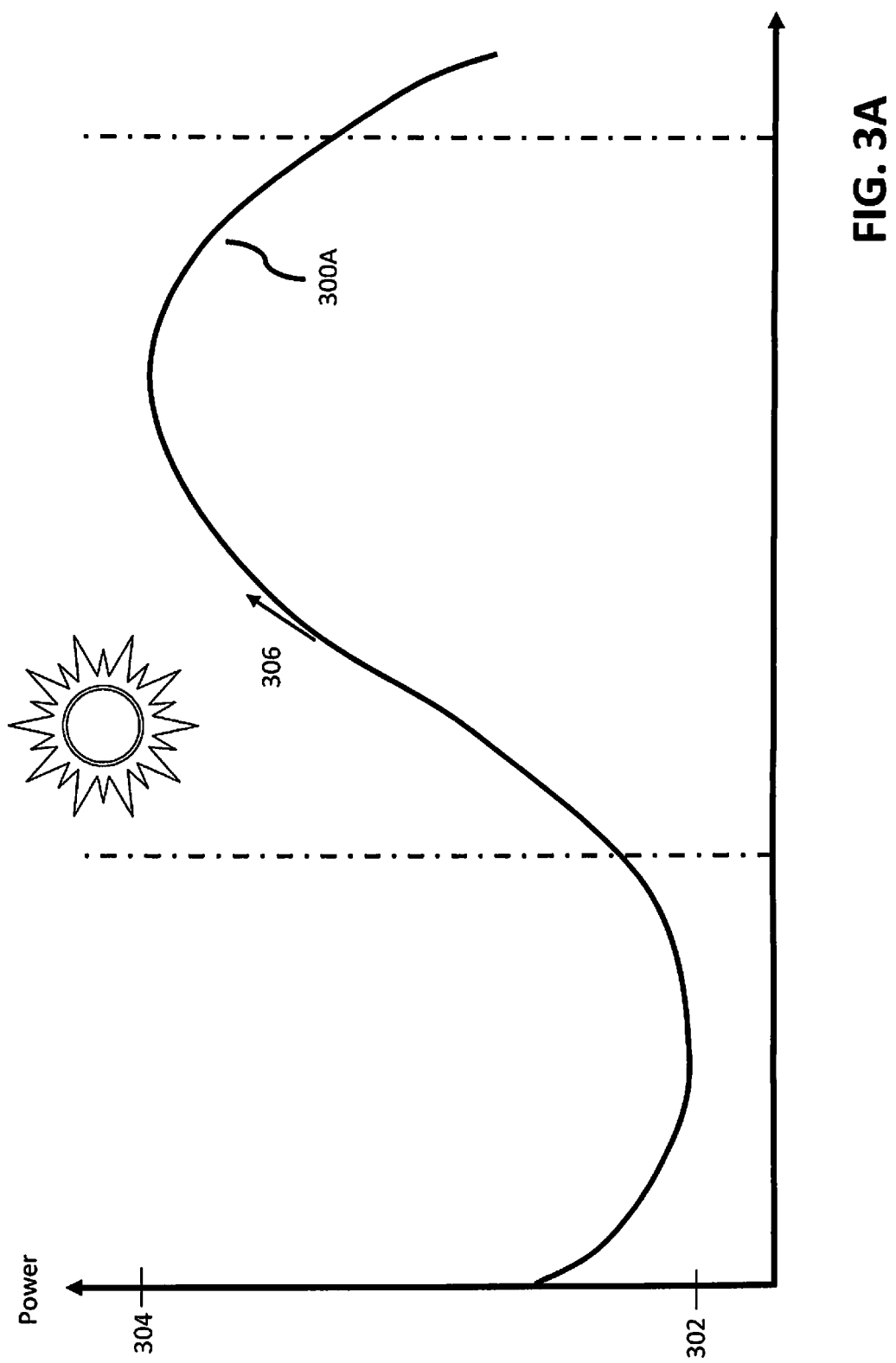

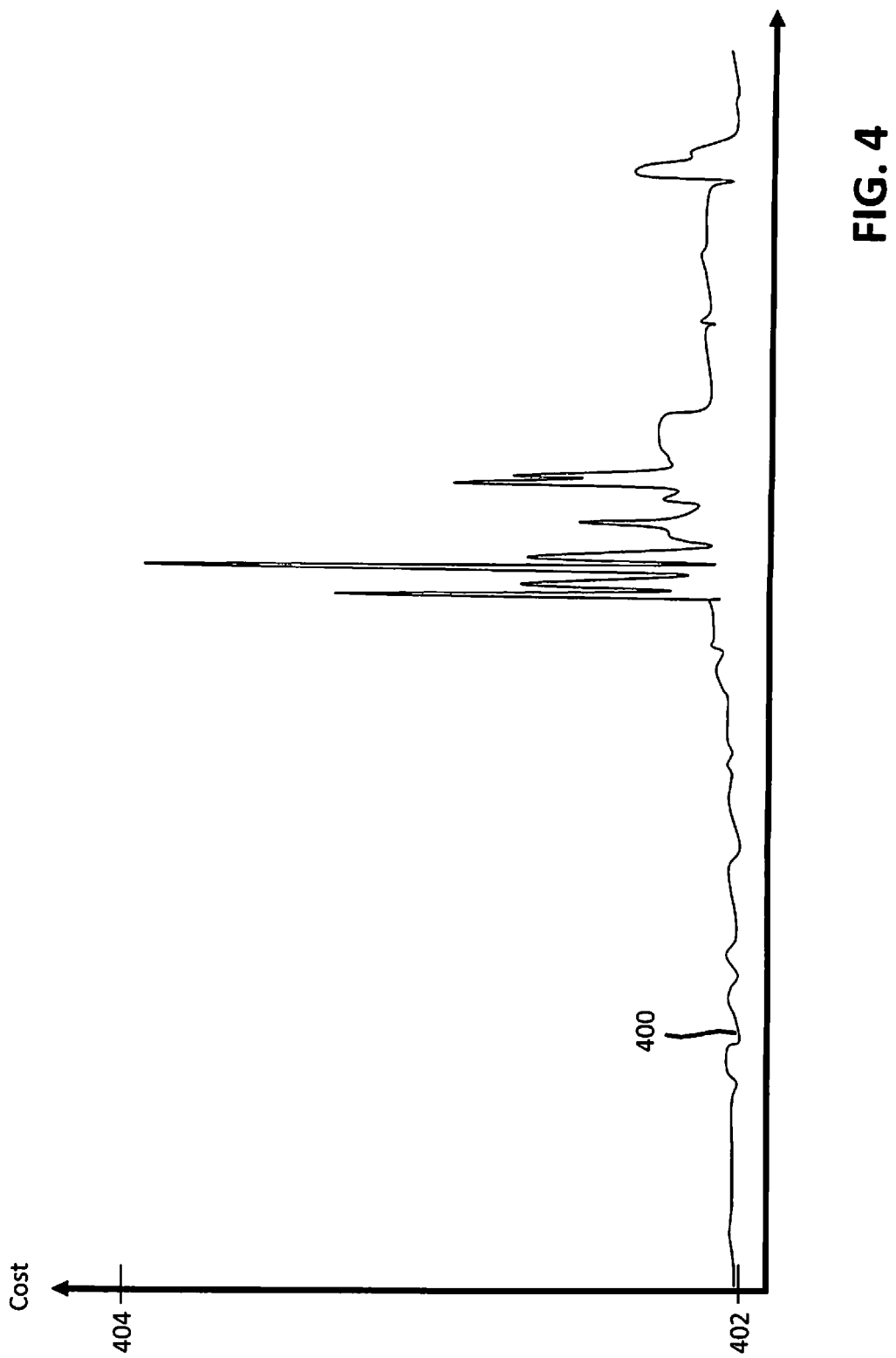

DEMAND RESPONSE OF LOADS HAVING THERMAL RESERVES

RELATED APPLICATION INFORMATION

This application is a National Phase entry of PCT Application No. PCT/EP2020/025314, filed Jul. 2, 2020, which application claims the benefit of priority to U.S. Provisional Application No. 62/870,159, filed Jul. 3, 2019, the entire disclosures of which are incorporated herein by reference.

This invention was made with government support under DE-AR0000703 awarded by the U.S. Department of Energy. The government has certain rights in the invention.

TECHNICAL FIELD

Systems, devices, and methods are disclosed herein that relate to demand response in power grids and networks. Specifically, embodiments herein include devices and systems that can be coordinated to use the thermal reserve of certain distributed loads in the power grid to support efficient use of peak load power and reduction of power usage ramp rates to better accommodate the use of distributed energy resources such as solar and wind power.

BACKGROUND

Conventionally, power distribution has been a one-way transmission of power from a central power plant or system of power plants to a grid of connected customers, each of whom is associated with an electrical load. The power from the power plant or plants is routed through a system of power lines to optional inverters, and from those inverters to loads such as residential homes. Increasingly, power distribution and demand response or control have been accomplished by use of centralized software systems that are operated on a utility scale, such as Eaton's YUKON™ Operational Data Management System (ODMS) software. (haps://www.eaton.com/us/en-us/catalog/utility-and-grid-solutions/demand-response-manager).

Power generation can be accomplished by any of a number of sources. One type of generation is so-called "base load" power plants that produce a consistent, large quantity of power at relatively low cost. However, because such "base load" plants are by their nature slow and expensive to turn on and off, they typically provide the "base" level of power needed in a system. Other power sources can be used to provide additional power when there is more demand than the base load power plants provide. These "peak load" systems can be turned on or off as needed to generate power. In general, there is a trade-off between the ability to quickly provide large quantities of power on-demand and the cost of that power. Therefore it is generally in the best interests of a utility to reduce the peak power required with so-called "peak shaving" techniques that keep the overall power requirements within any given time period to a smaller band. The larger that range of power required in a day, the more peak power will be needed, increasing cost to deliver the power. Similarly, the faster the demand for power spikes from low to high within a day, the more nimble those peak load power supplies will need to be, which likewise increases cost to deliver the power.

Increasingly, power is supplied to power grids from Distributed Energy Resources (DER). Such DERs include photovoltaics, solar-thermal systems, wind, biomass, and geothermal power sources, among others. DERs provide a voltage boost to the grid wherever they are connected. In small quantities, DERs can reduce the power required of a base load generator such as a power plant. As such, DER is seen as a mechanism for achieving reduced greenhouse gas emissions, and, if implemented properly, a mechanism for reducing load on the electrical grids in which they are deployed. Conventional power grids designed based on power provided by base load plants are often ill equipped to deal with the ramifications of significant levels of DER power generation on a particular grid. In areas where DERs exceed a certain threshold, the power generated by DERs, either alone or in combination with power provided by a base plant, can exceed the demand for power amongst the loads on that portion of the grid. This can cause so-called "upstream" current flow, away from the DERs and loads and towards the power plant. Conventional power grids were not designed to accommodate this type of current flow, and often this scenario results in either overvoltage at the area of the grid having DERs, or disconnection of the DERs and loads from the grid entirely. The inability of conventional power grids to handle DER in excess of the power draw required by the load in the grid has caused some utilities to throttle the implementation of renewable technologies in areas where the DERs can exceed the minimum power usage in that area.

In order to accommodate changing usage of electricity over time, as well as to accommodate the increasing prevalence of DERs, demand response systems have been implemented by many utilities. Demand response refers to the management of loads on an electrical grid, as opposed to older grid technology in which the primary mechanism for ensuring that appropriate power levels were distributed throughout a grid was by matching constantly-changing loads with corresponding changes in generation. In a typical demand response system, both generation and demand can be modified to at least some extent.

Even where the level of DER is low enough that upstream current flow does not occur, the use of DER can create more complex patterns of demand, with unexpected or high volume changes in loads within a grid, and the response of demand response systems within that grid to these changes can cause further destabilization of a grid. Turning off all of the systems that are controllable in a demand response system for an extended period of time results in customer dissatisfaction, and at the end of the demand response period the loads can spike dramatically as the demand response loads, such as air conditioners or water heaters, can all turn on simultaneously. This type of unpredictability, combined with inherent cyclical changes in usage throughout the day based on sunlight, weather, and working hours, can require significant generation variation over time. Changing the amount of generation rapidly can require the use of expensive, peak load generation devices.

Decentralized systems have been developed to respond to this problem, such as those described in U.S. Pat. Nos. 9,927,131, 9,461,470, and 9,236,737. Adapting to demand response events can also create problems such as dealing with fan control (as described in U.S. Pat. No. 8,720,791) or offsetting efficiency reductions that can be created by unexpected or poorly timed demand response shutdown of certain devices (as described in U.S. Pat. No. 9,528,717).

U.S. Pat. No. 8,204,633 and U.S. Publ. Appl. Nos. 2011-0123179 A1 and 2012-0055419 A1 describe water heater demand-side management systems that rely on observability and controllability of an individual electric water heater as a demand response load having a thermal reserve. The water temperature of each system can be directly measured from temperature sensors, and the upper and lower heating elements can be turned on/off explicitly. This type of individual hardware monitoring implementation for a demand response load typically means high cost and a requirement that the individual sensor and usage information must be provided to a centralized resource such as a utility.

U.S. Publ. Appl. No. 2004-0034484 A1 and Chinese Patent No. CN 104482654 A describe another type of demand-response energy management which provides for control of a particular demand response load having a thermal reserve, such as an air conditioner or water heater. Such control systems often require modifying the set point of thermal systems, which can result in customer dissatisfaction, because most users of hot water or air conditioning expect some consistency in the temperature output from these load devices to be fairly consistent. Such control systems also require the customer to purchase special smart appliances that give access to its set point for adjustment.

It would be desirable to provide for centralized systems and methods that could better address the increasing unpredictability, ever-growing peak demand, and faster ramp rate in power system operation through more efficient demand response to better accommodate DER penetration.

SUMMARY

According to one embodiment, a system for managing electrical demand corresponding to a plurality of electrical loads having thermal reserves is disclosed. The system operates on a grid coupled to both a power generation source (or multiple sources) and a plurality of loads, wherein each of the plurality of electrical loads is coupled to a corresponding thermal reserve such that operation of the electrical load increases the thermal reserve (e.g., an air conditioner cooling an air mass within a house, or a water heater heating a tank of water). The system includes a cloud-based demand response system configured to selectively turn off a subset of the plurality of electrical loads. In some embodiments, the cloud-based demand response system includes a power market module configured to acquire power prices information, a closed-loop feedback control module configured to receive the power reference information from the power market module and regulate the total power consumption from the plurality of electrical loads. In some embodiments, the cloud-based demand response system includes a dispatcher module configured to rank the plurality of electrical loads as a function of the estimation of the corresponding thermal reserves and send a demand response signal to each one of the plurality of loads.

In some embodiments, a device edge control layer is also arranged at each one of the plurality of loads, the device edge control layer comprising a historian module configured to collect a past power usage of the one of the plurality of loads, a load statistical model module configured to generate a device model based upon the past power usage of the one of the plurality of loads and the corresponding thermal reserve, and send the device model to the cloud-based demand response system, and a real-time control module configured to receive the demand response signal to selectively turn the one of the plurality of electrical loads on or off.

In embodiments, the load statistical module is configured to apply a rolling average filter to power usage of the one of the plurality of loads to generate an averaged power data set, combine the averaged power data set with a historical data set corresponding to a similar day from the historian module, and generate an updated daily average power pattern that is stored in the historian module. In embodiments, the historical data set corresponding to a similar day is a data set of power consumption selected according to day of the week. In embodiments, the historical data set corresponding to a similar day is a data set of power consumption selected according to weather conditions selected from the group consisting of temperature, humidity, and cloud cover.

In some embodiments, the one of the plurality of electrical loads is associated with an observable thermal reserve. The one of the plurality of loads can be a water heater and the thermal reserve can be a tank of heated water having an observable temperature. Additionally or alternatively, the one of the plurality of loads can be an air conditioning system and the thermal reserve can be a cooled air mass having an observable temperature.

In embodiments, the real-time control module can be configured to determine an operating state of the one of the plurality of electrical loads. The real-time control module can be configured to operate the one of the plurality of loads in all of three states including an idling state, a modified operation state, and an opt-out state. The real-time control module can be configured to apply an opt-out state when a thermal reserve associated with the one of the plurality of loads is not within a predefined temperature band.

According to another embodiment, a method for managing demand of a plurality of electrical loads is disclosed. According to the method, each electrical load that is coupled to a corresponding thermal reserve within a grid system can be controlled. The method includes acquiring a baseline electrical demand of the grid system and ranking the plurality of electrical loads at a cloud-based demand response system remote from the plurality of electrical loads, wherein the ranking is based upon: (a) whether each one of the plurality of thermal reserves is in an on state, (b) what the current temperature at each of the plurality of electrical loads is compared to a set point of that one of the plurality of electrical loads, (c) how long it has been since each one of the plurality of electrical loads has last been provided with a demand-response command, and (d) whether each one of the plurality of electrical loads is in an opt-out mode. The method further includes sending a demand response signal to each of the plurality of electrical loads that has a ranking above a threshold.

In some embodiments, each of the plurality of electrical loads corresponds to a thermal reserve that is observable.

In some embodiments, each of the plurality of electrical loads includes a device edge control layer that is communicatively coupled to the cloud-based demand response system and comprises a historian module, a load statistical model module, and a real-time control module.

In embodiments, the method includes collecting a past power usage at the historian module, generating a model future power usage based upon the past power usage, sending the model future power usage to the cloud-based demand response system, and receiving the demand response signal at the one of the plurality of electrical loads. After receiving the demand response signal at the one of the plurality of electrical loads, the real-time control module may operate the one of the plurality of loads in all of three states including an idling state, a modified operation state, and an opt-out state. The real-time control module may operate the one of the plurality of loads in an idling state in the absence of the demand response signal. The real-time control module may operate the one of the plurality of loads in the opt-out state when a thermal reserve associated with the one of the plurality of electrical loads is outside of a predetermined temperature band. The real-time control module may operate the one of the plurality of loads in the modified operation state when a demand response signal has been received and the thermal reserve is within the predetermined temperature band. While in the modified operation state, the one of the plurality of electrical loads may be shut down based upon a demand response signal relating to reducing demand, or the one of the plurality of electrical loads may be turned on based upon a demand response signal relating to increasing demand, in embodiments.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3A is a chart of a conventional demand curve.

FIG. 4 is a chart of price for power generation.

Figure 1:
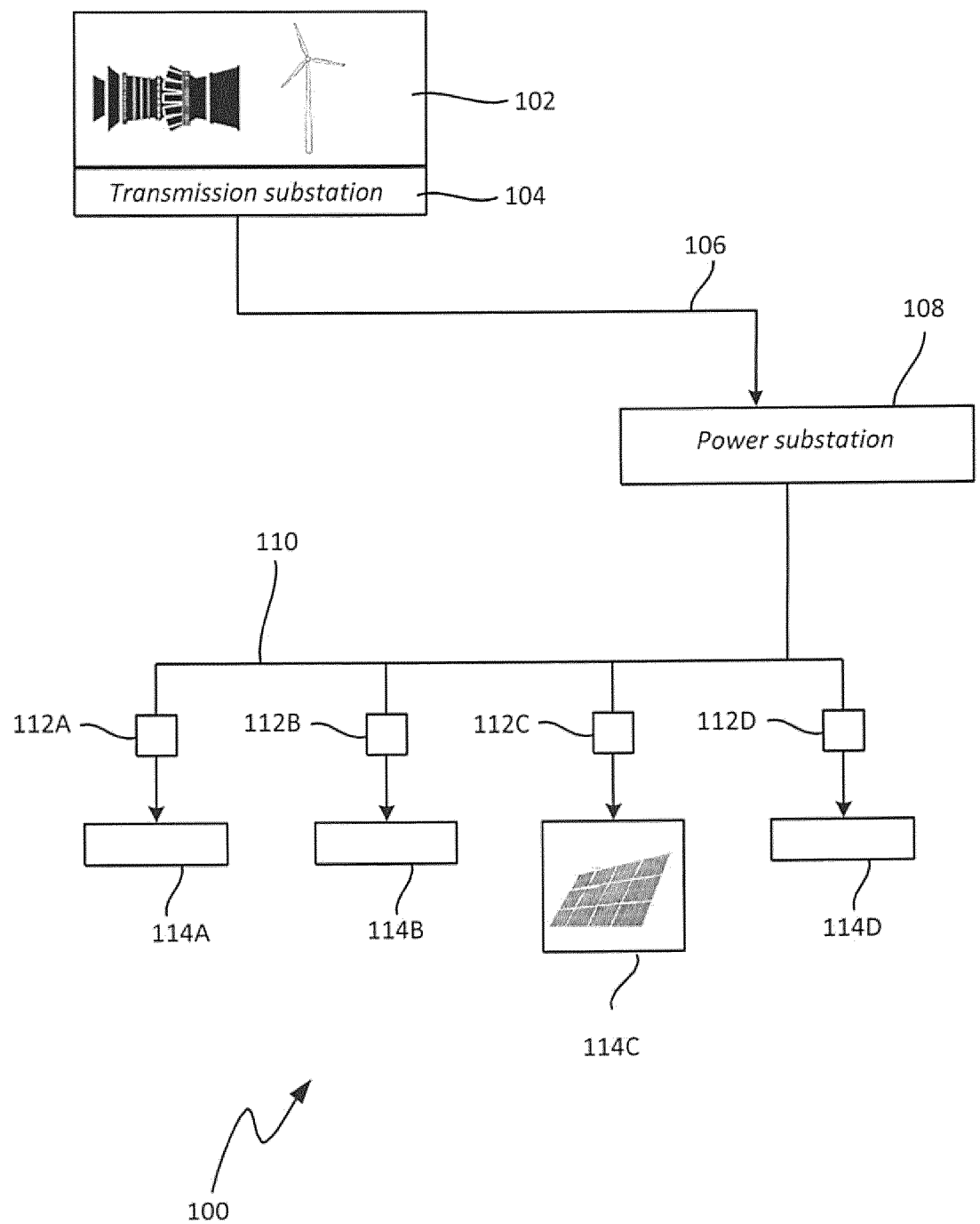
FIG. 1 is a simplified schematic of a grid according to an embodiment that includes distributed generation.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As Distributed Energy Resources (DERs) become a greater share of the overall energy generation mixture, novel solutions are needed to accomplish more complex tasks related to peak load shaving power fluctuation smoothing, and power ramp rates reduction. Otherwise, power suppliers will need to rely upon expensive, inefficient peak power supplies that can be switched on and off quickly to satisfy quickly fluctuating demand. As described herein, thermal reserves can be used as storage and, in combination with demand modeling and other data inputs, ramp rates for power generation can be reduced.

FIG. 1 is a schematic view of a grid 100. Grid 100 includes power generation 102, which (as depicted in the drawing) can be one or more of a number of sources such as coal, natural gas, wind, solar, hydroelectric, or biomass, among others. Power is transmitted from power generation 102 to transmission substation 104, which produces relatively constant high-voltage power along transmission line 106. Before reaching individual end users, high-voltage power on transmission line 106 is converted to distribution-voltage power at power substation 108. From power station 108, a power line 110 can provide electricity to a number of transformers 112A-112D, which are in turn coupled to residences 114A-114D. It should be understood that while FIG. 1 depicts residences 114A-114D, in other portions of the power grid there could be other loads, such as industrial or commercial loads, at 114A-114D.

As shown in FIG. 1, residence 114C includes a photovoltaic or photothermal DER. An increasing portion of end users on a power grid have adopted DER power generation and storage recently, and beyond a certain threshold this can create challenges with grid maintenance that were not previously observed. Therefore the power substation 108 and the transformers 112A-112D may need to be able to adapt to changing power consumption patterns (i.e., the difference between consumption and generation) at a much more rapid rate than before the widespread adoption of DER power sources.

Figure 2:
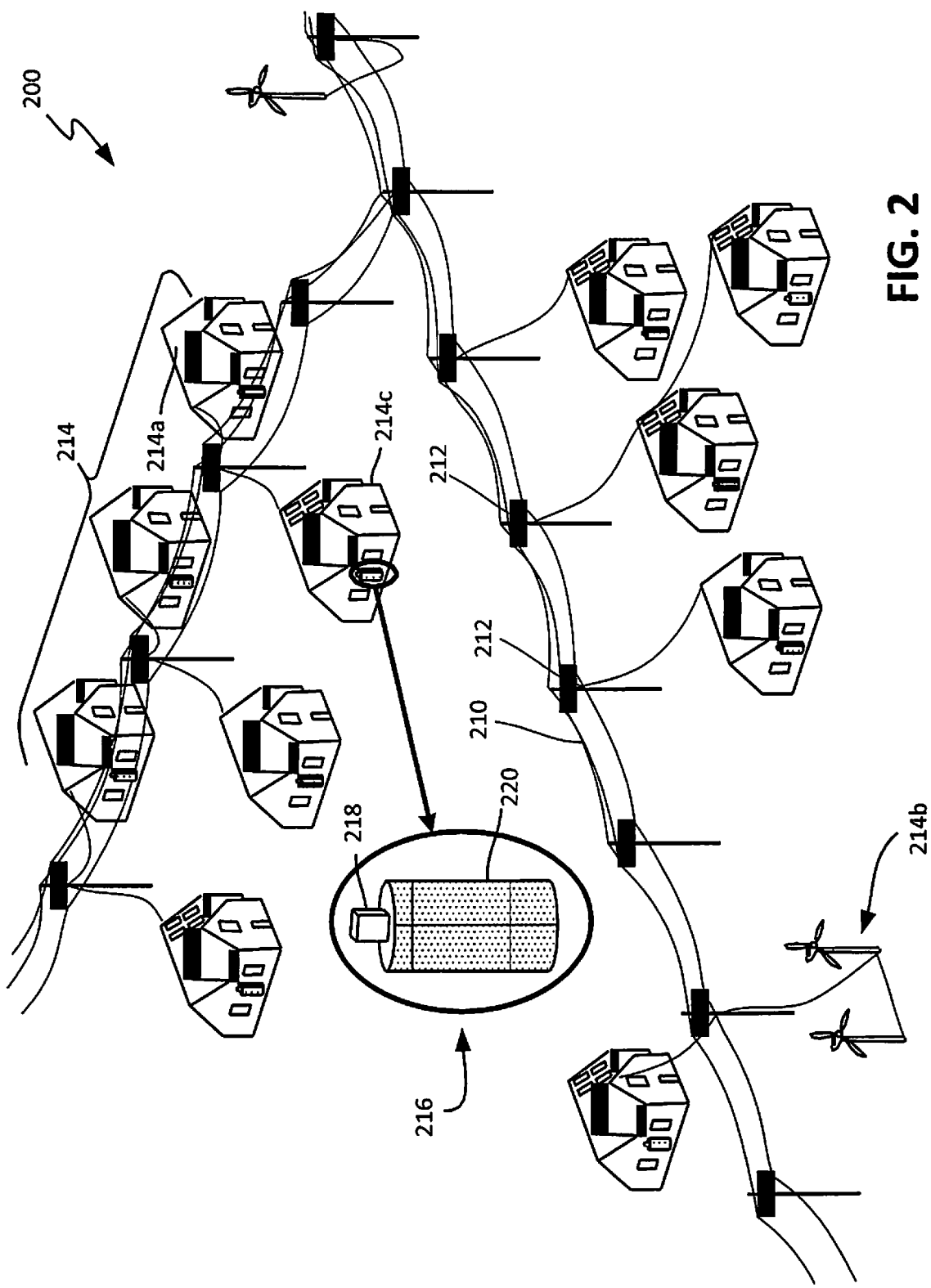
FIG. 2 is a simplified schematic of a series of residences on a common section of a grid, wherein the section includes both distributed generation and a demand-response water heater according to an embodiment.

FIG. 2 is a simplified view of a neighborhood 200 of residences 214. These residences 214 are coupled to DERs including solar panels 214a and wind turbines 214b. As shown in FIG. 2, a distribution bus 210 carries electrical power throughout an area of the electrical grid. At various points along distribution bus 210, transformers 212 split a single-phase power line off from the main distribution bus 210 towards loads 214. Loads 214 come in various types. There are purely positive-impedance loads 214a, which take power from distribution bus 510. There are also purely negative-impedance loads 214b, which are not really "loads" in the conventional sense but rather DER power sources (here, a wind power turbine). Finally, there are mixed loads 214c, which have DER generation capability (shown as photovoltaic panels in FIG. 2) but also draw power from the electrical grid.

In the network 200 shown in FIG. 2, each of the positive-impedance loads 214a and mixed loads 214c are outfitted with an electric water heater 216. Each electric water heater 216 includes a control module 218 and a water heater tank 220. The control module 218 can operate thermostats and/or heating elements of the water heater tank 220, for example in accordance with the method described with respect to FIGS. 7-11.

FIG. 3A is a chart of a conventional demand curve, showing overall power demand on the grid along the y-axis and time of day along the x-axis. As shown in FIG. 3A, power consumption 300A follows a fairly smooth curve, with lowest demand 302 occurring shortly before sunrise (daylight is indicated by the dashed lines around the sun) and peak demand 304 occurring in the afternoon. FIG. 3A further shows the highest ramp rate 306, or rate at which power supply must be increased during the day, indicated as an arrow at a tangent to consumption 300A.

Power consumption 300A is similar to a sinusoidal wave and will repeat each day, with variations due to sunlight, temperature, and day of the week or weekend, among other factors. Power consumption 300A is a typical representation of a conventional grid's consumption levels, in which afternoon heat causes higher draw of power from the system for air conditioning, while nighttime power usage is lowest due to reduced draw for air conditioning, hot water, and lighting.

In general, it is desirable to reduce the difference between the lowest demand 302 and the highest demand 304. For this reason, some systems can apply "peak shaving" or "load shedding" during times when usage is highest. For example, on a particularly hot day the highest demand 304 may be elevated due to increased use of air conditioning. When the highest demand 304 exceeds a certain level, expensive peak generation systems may need to be activated (or more power may need to be purchased for the power grid from other suppliers, often at a high rate, as described in more detail below with respect to FIG. 4). Rather than take any of these steps, load shedding systems reduce peak power usage by shutting off or reducing the runtime of electronic devices (most commonly air conditioners) during periods of high power usage. "Peak shaving" thus flattens the top of the power consumption 300A curve, delaying some of the power draw until after peak consumption would otherwise have passed.

Figure 3B:
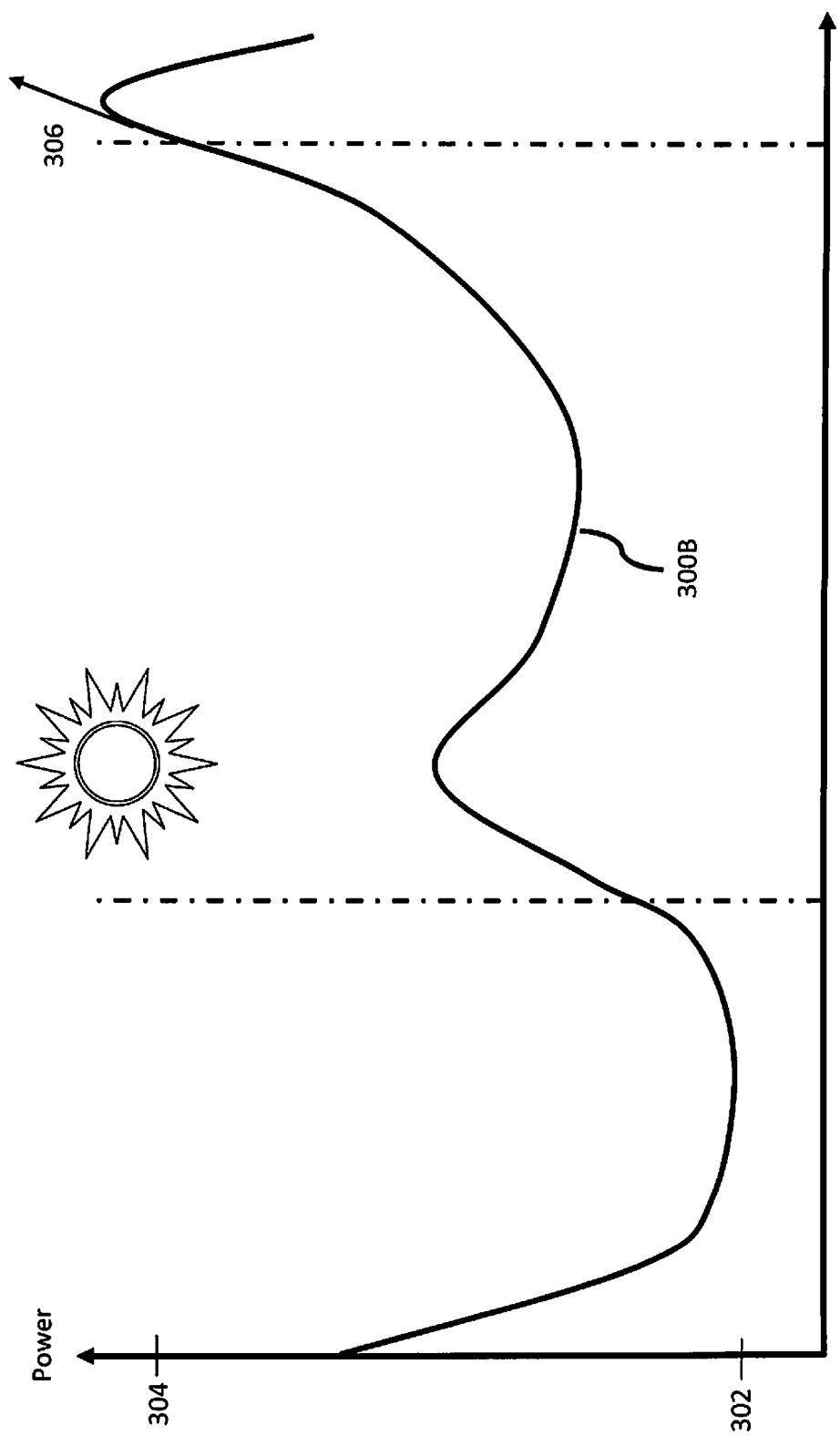
FIG. 3B is a chart of a conventional demand curve in a grid including significant distributed generation.

FIG. 3B shows an alternative power consumption curve 300B. Power curve 300B is shaped quite differently than power curve 300A of FIG. 3A because it corresponds to a grid that includes a substantial quantity of DER power sources. DERs such as solar and wind typically create more energy during daylight hours and less at night, due to reduce insolation and wind speed. Power curve 300B shows the effect this has on the overall demand for power, as midday generation more than offsets peak power usage, resulting in a trough rather than a peak around midday. The difference between lowest demand 302 and highest demand 304 may in fact be significantly lower than the difference between those same markers in FIG. 3A, as the peak is more than offset.

The features shown in FIG. 3B are becoming more exaggerated over time, in a phenomenon referred to as the "duck curve." The "duck curve" refers to a series of load profiles anticipated in various future years. The day time net load drops lower and lower due to PV generation (which forms the belly of a duck), while the dusk time net load ramps up rapidly due to the decreasing photovoltaic generation and increasing electric vehicle charging (which forms the neck of the duck). The "duck curve" creates several other types of problems for grid management.

First, the highest ramp rate 306 of power curve 300B can be substantially increased compared to its equivalent highest ramp rate 306 of power curve 300A (FIG. 3A). After dark, DERs reduce production significantly (or, in some cases, entirely) while demand is still high, causing net demand on the utility to rapidly meet demand, only to have that demand drop off again shortly thereafter. This problem is exacerbated by the adoption of other technologies such as electric vehicles that are often charged around dusk, creating a short-term, substantial power draw around the same time that the output of DERs drops off for the day. In some cases in California, for example, net load has been known to increase by 10 GW over the course of two hours. This rate is expected to increase in coming years as more DER and electric vehicles or other electrical storage devices are deployed.

As shown in FIG. 4, the price of power purchased during the course of a day can vary widely based upon, primarily, the amount of power needed in excess of the base power (i.e., difference between power curves 300A and 300B and the corresponding lowest demands 302) and the ramp rate (i.e., the tangent lines 306). When the overall power draw is high, less-efficient, more-expensive "peaker" power generation may be needed. Similarly, when ramp rates 306 are high, fast-responding but inefficient generators are needed to hold the power system stable. Power price 400 of FIG. 4 can therefore range from a low price 402 that is a few cents per kWh to a few dollars per kWh when the overall demand or the demand ramp rate are sufficiently high. The New York Independent System Operator (NYISO) locational based marginal price at Long Island on Aug. 11, 2016, for example, ranged from a low (402 of FIG. 4) of $0.0239/kWh to a peak of $2.515/kWh, a difference in price for peak energy of more than a factor of 100.

As described in more detail below with respect to FIGS. 7-11, embodiments disclosed herein use predictive modeling as well as an intelligent ranking system to use thermal reserves to smooth the overall demand curve. This smoothing effect can reduce both the peak power demand (304) and the ramp rate (306), reduce variability in demand, and do so in a way that is not as noticeable to consumers and therefore can result in higher adoption rates than conventional load shedding schemes.

Figure 5:
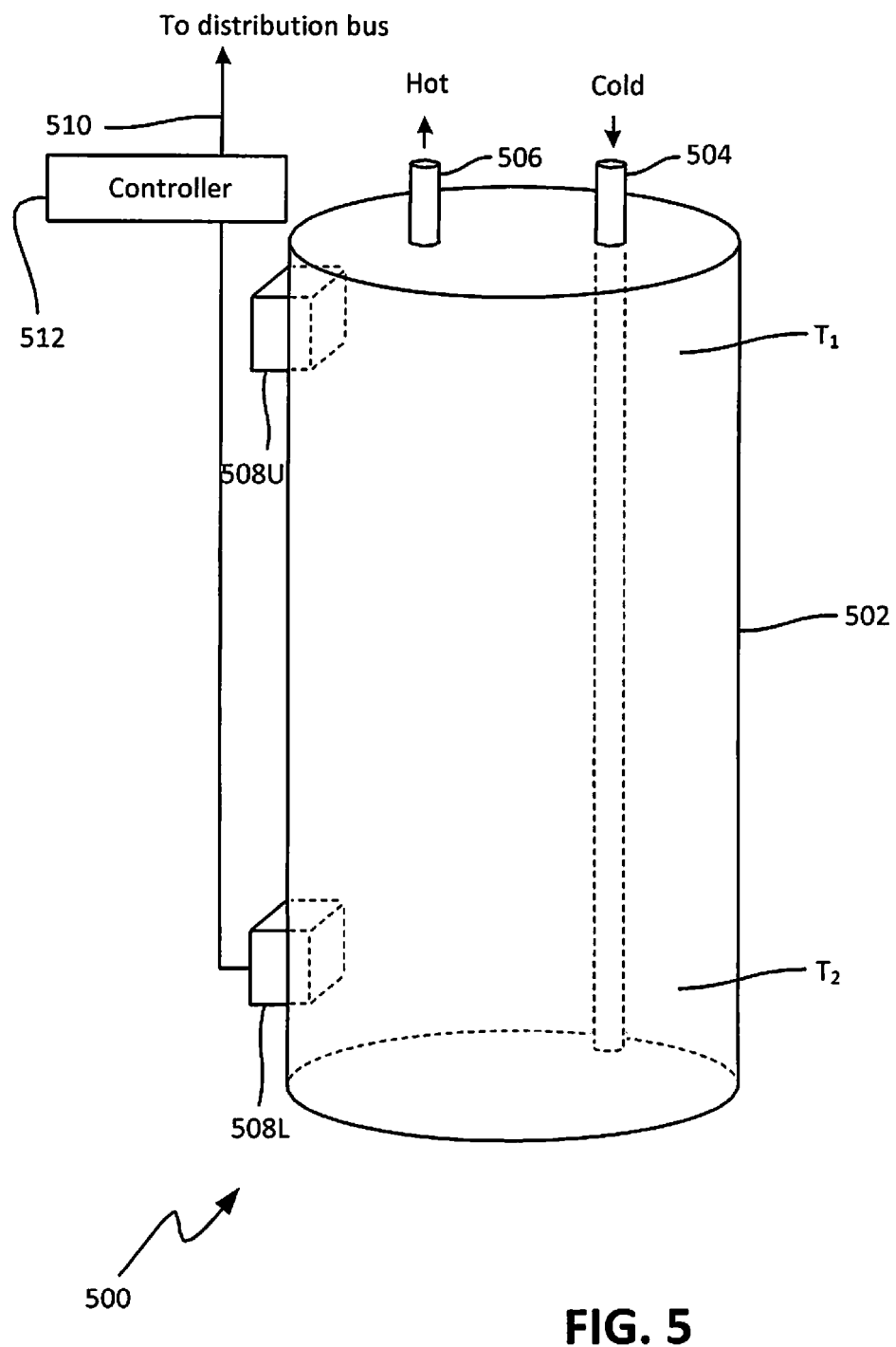
FIG. 5 is a simplified perspective view of a water heater according to an embodiment.

FIG. 5 is a simplified perspective view of a water heating system 500, according to an embodiment. According to the embodiment shown in FIG. 5, a tank 502 is coupled to a water line via cold water input 504, and provides hot water via hot water output 506. Water heating system 500 includes lower heating package 508L and upper heating package 508U. Each of the water heating packages 508L and 508U are connected to power line 510 via controller 512. Power line 510 is connected to a distribution grid (e.g., distribution voltage power line 110 of FIG. 1), via an intervening transformer (e.g., one of transformers 112A-112D of FIG. 1). It should be understood that water heating system 500 of FIG. 5 has been simplified for clarity. For example, tank 502 may contain safety pressure relief systems or water draining systems that are not directly impacted by the systems described herein, and as such have been omitted.

To aid in description of water heating system 500, directional labels such as "top" and "bottom" or "upper" and "lower" are used. It should be understood that these labels are with reference to a gravitational reference frame. As shown in FIG. 5, the "top" is at the top of the page and the "bottom" is at the bottom of the page. These directions are useful in describing the function of a traditional water heater, wherein stored hot water rises while stored cold water falls, with respect to gravity. In other embodiments, other reference frames may be used, and the reference frame described herein should not be construed to limit the invention, as there are other orientations and reference frames that are usable to accomplish the same or similar results.

Like conventional water heater tanks, tank 502 is configured to hold a certain quantity of hot water (often 20-100 gallons) ready for use in a residential setting. In operation, the water contained by tank 502 is thermally stratified; that is, the water at the top of tank 502 will be at a relatively higher temperature (indicated as temperature $T_1$), while the water at the bottom of tank 502 will be at a relatively lower temperature (indicated as temperature $T_2$).

Cold water is introduced at cold water input 504, which is attached to a water source (such as a municipal water line or a well) to provide a supply of cold water. To promote the thermal stratification of the water held by tank 502, cold water input 504 routes this cold water to the bottom of tank 502. As shown in FIG. 5, cold water input 504 is a dip tube. Similarly, hot water output 506 promotes the thermal stratification of tank 502 by removing hot water from a location near the top of tank 502. Typically, as hot water output 506 draws water from tank 502, a substantially equivalent quantity of cold water is introduced at the bottom of tank 502 by cold water input 504.

In some embodiments, as cold water is introduced at the bottom of the tank the bottom thermostat will call for heat and energize the bottom element (assuming that the top element is not heating). While the bottom thermostat and element do most of the water heating work, the top thermostat and element can be used to respond to an extended hot water draw. The top thermostat and element thus provide for fast recovery.

Lower heating package 508L and upper heating package 508U include resistive heaters in the embodiment shown in FIG. 5, configured to heat water in tank 502, as well as thermostats. In alternative embodiments, heat pumps or other heating systems could be used instead of or in addition to resistive heating elements. Lower heating package 508L and upper heating package 508U typically will not operate their resistive heaters at the same time, to prevent overloading the circuit from which water heating system 500 draws power. Rather, upper heating package 508U is configured to heat the water stored in the upper portion of tank 502 until the temperature $T_1$ in that region reaches a preset value. Once temperature $T_1$ reaches that preset value, lower heating package 508L is configured to heat the water stored in the lower portion of tank 502 until the temperature $T_2$ in that region reaches a second preset value, often lower than the preset value for temperature $T_1$.

Power line 510 provides power to operate lower heating package 508L and upper heating package 508U. Power line 510 is connected to a distribution bus (e.g., distribution power line 110 of FIG. 1). In some embodiments, a simple step-down transformer (e.g., transformers 112A-112D of FIG. 1) is located in between power line 510 and the distribution bus.

Controller 512 can control the heating packages 508L and 508U according to a local control model which, as described above, is based entirely upon the temperatures $T_1$ and $T_2$. Alternatively, controller 512 can operate the heating packages 508L and 508U in accordance with a demand smoothing and peak load shedding system as described in more detail below with respect to FIGS. 7-11. To do so, controller 512 communicates with both upper heating package 208U and lower heating package 208L electronically. In the embodiment shown in FIG. 5, this is a wired communications means. In alternative embodiments, however, the means for communicating with two or more heating packages can be wired or wireless, or the heating packages may not be connected to a communication network whatsoever and are instead modeled as described in more detail below. For example, a wired means could include a signal wire that instructs either of the heating packages 508U and/or 508L whether to operate or cease operating. In other embodiments, the wired communication could be a cable that is either powered or unpowered based on whether the heating packages 508U or 508L should run. In other embodiments, controller 512 can provide a wireless signal, such as via WIFI, Bluetooth, or another signal that propagates wirelessly, to instruct the heating packages 508U or 508L that they should run or not run. In embodiments, power need not be routed to the heating packages 508U or 508L through controller 512.

By powering the heating packages 508U and 508L as directed by the controller 512, the draw of power from the distribution bus can be spread out to make improved use of DERs, and prevent overvoltage, high peak power usage, and high ramp rates. Particular methods for operating the heating packages 508U and 508L can be implemented by the controller 512. The mechanism for carrying out these methods can be incorporated into the controller 512 as, for example, software (e.g., a processor that is designed to run a particular routine for operating the heating packages 508U and 508L based on received inputs) or hardware (e.g., bimetal thermometers, liquid expansion thermometers, or other sensors and/or actuators that correspond to specific temperatures at locations within the tank 502, for example). Controller 512 can be directed to implement a program by a centralized system, such as a utility demand response command.

In embodiments, the water heater 500 can have observability of no sensors, one sensor, or two sensors. Many older water heaters have "no sensor" observability. In this configuration, no thermal sensor (i.e., neither of the sensors associated with heating packages 508U or 508L) is available to provide the water temperature measurement. The control has to rely on the internal model predictive estimator to provide insights to the operating status of the water heater.

In a "one sensor" configuration, one thermal sensor can be available, such as at the middle of the water tank, to tell the average water temperature in the tank. The optimal location is dependent on the actual control implementation and can vary between different embodiments. The control can directly take this information to calculate the reserve capacity and decide when to opt out of demand reserve events, in embodiments.

In a "two sensor" configuration, two thermal sensors are installed to provide water temperature measurement of both the upper and lower portions of the tank (e.g., at the upper package 508U and at the lower package 508L). The control can directly take this information to accurately calculate the reserve capacity, decide when to opt out or demand reserve events, and better control the upper and lower heating elements separately (if adequate controllability is available) for best quality of service.

Figure 6:
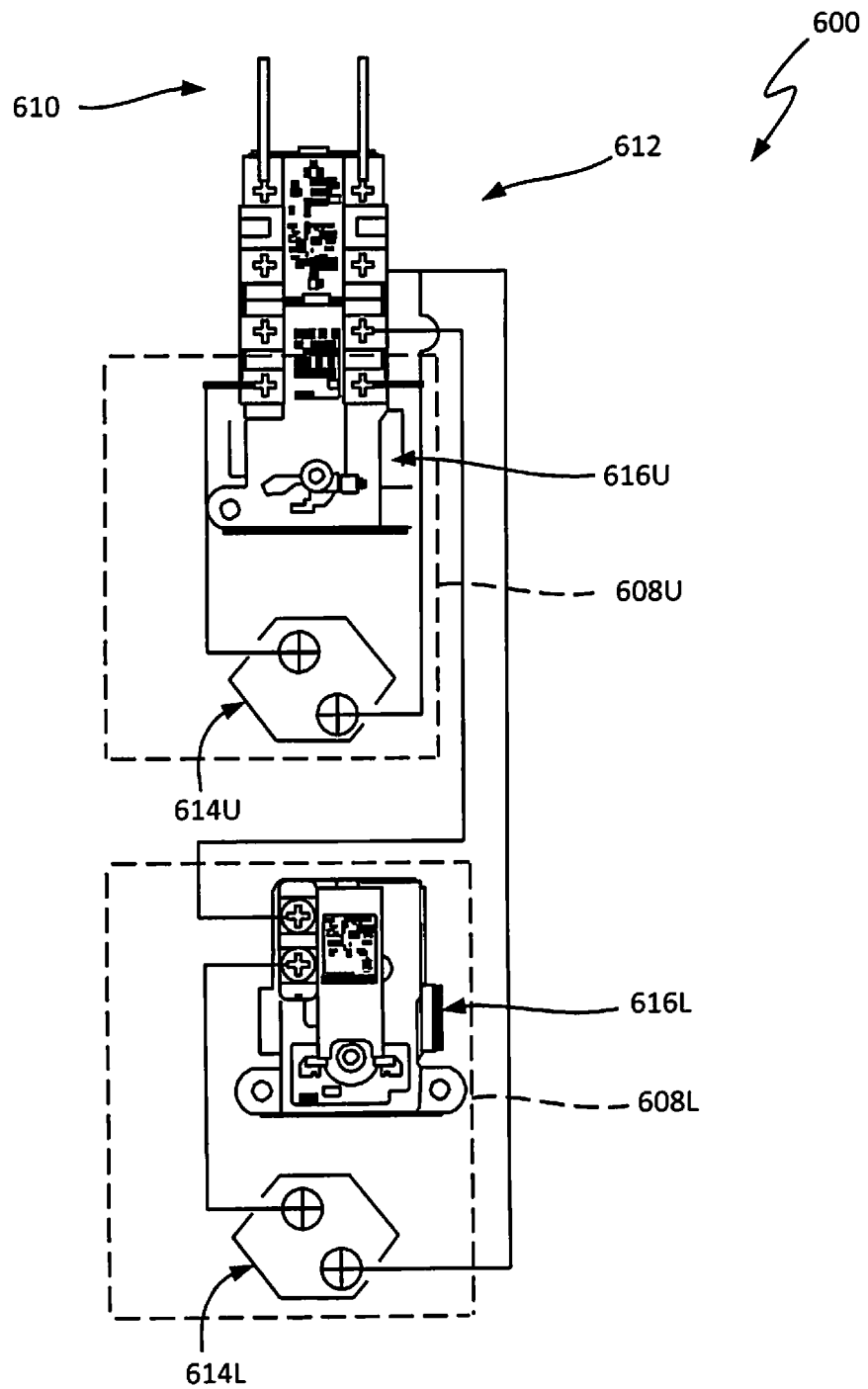
FIG. 6 is a wiring diagram of a water heater according to an embodiment.

FIG. 6 is a wiring diagram of a water heating system 600, according to an embodiment. Water heating system 600 includes lower heating package 608L, upper heating package 608U, power line 610, and controller 612. Lower heating package 608L includes lower resistive load 614L and lower thermostat 616L. Similarly, upper heating package 608U includes upper resistive load 614U and upper thermostat 616U. Similar elements to those described previously with respect to FIG. 5 are recognizable by similar numbering, in that those elements are iterated by 100. For example, lower heating package 508L of FIG. 5 is substantially similar to lower heating package 608L of FIG. 6, and so on.

Each of the heating packages 608L and 608U are shown in more detail, and include both a resistive load (614L, 614U) and a thermostat (616L, 616U). The resistive loads (614L, 614U) can be used to convert electrical energy into thermal energy, dissipating heat into the adjacent water. As such, resistive loads 614L and 614U can be, for example, simple resistors. Thermostats 616L and 616U gauge temperature in the lower and upper portions of the water heater system (e.g., $T_2$ and $T_1$ of FIG. 5). Thermostats 616L and 616U could be, for example, thermocouples, thermistors, resistance thermometers, or some other device for measuring temperature.

Each of the heating packages 608L and 608U receive power via leads that connect them to power line 610 via controller 612. Controller 612 is configured to distribute power to each of the heating packages 608L and 608U based on the temperature measured at each of the thermostats 616L and 616U, as well as any signal received from a central source regarding implementation of demand response and smoothing. Controller 612 can allocate power amongst lower and upper heating packages 608L and 608U to maintain appropriate water temperature or store electrical energy from power lines 610 during specific time periods.

Controller 612 can also be configured to interact with a wired or wireless network. For example, controller 612 can include a processor and an antenna or bus configured to route data about the operation of the system to a mobile device, a server, or the utility.

Figure 7:
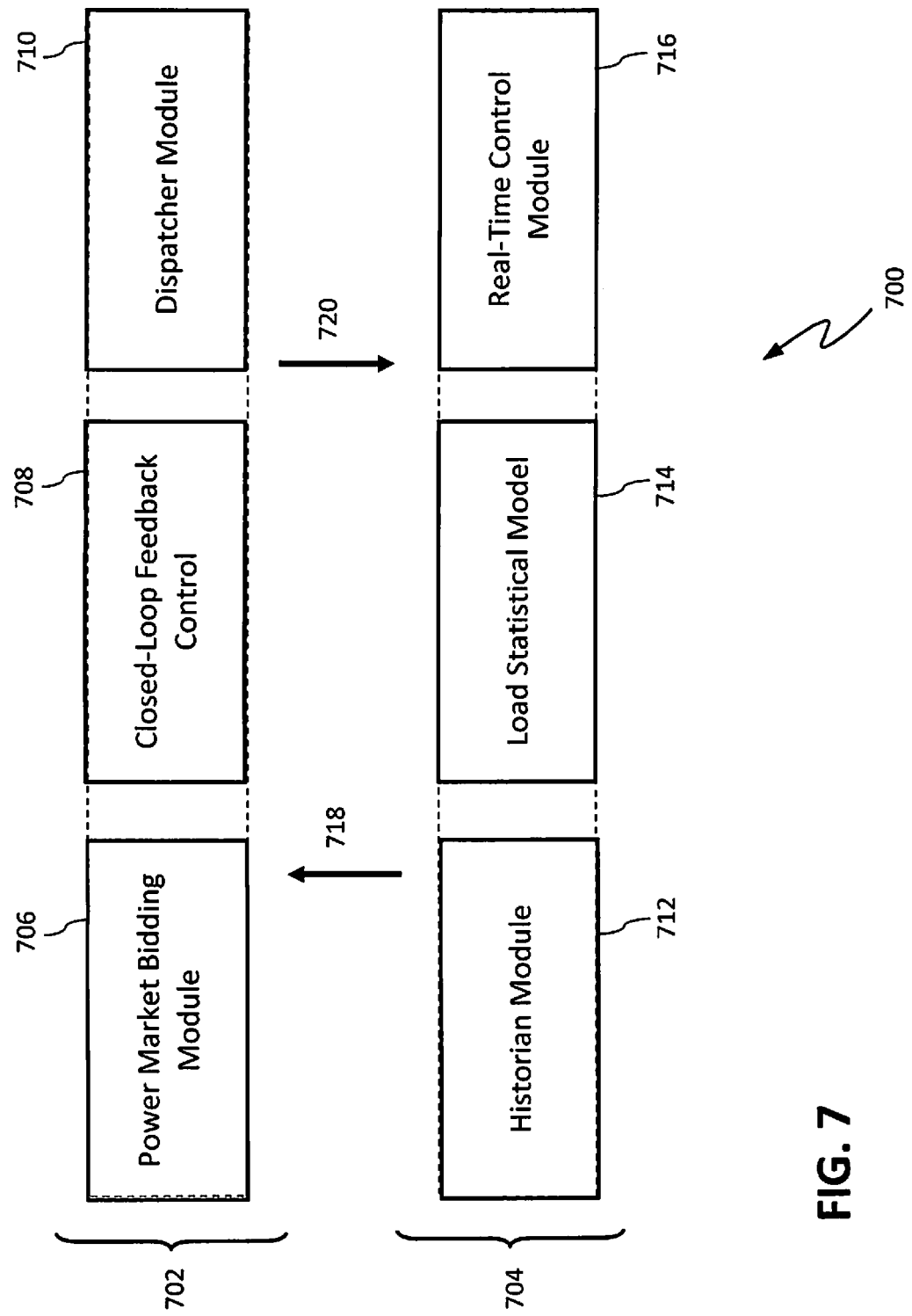
FIG. 7 is a two-layer system for control of a network of loads, according to an embodiment.

FIG. 7 is an overview of a control design concept 700 according to an embodiment. The control system 700 comprises two layers: a centralized control on cloud platform 702 and a local control attached to end devices 704. The cloud based control 702 readily supports scalability of the control system to accommodate tens of thousands of end devices, each having a device edge control layer 704. The cloud based control 702 uses real time feedback regulation to closely track reference reserve signals, while the device edge control layer 704 can record room temperature, power consumption, and weather information (through public weather API over internet) to generate high-accuracy predictive model of individual load with recognized user pattern. Such a model allows the device edge control layer 704 to maximize the reserve capacity and control flexibility while maintaining high quality of service.

As shown in FIG. 7, a cloud central control layer 702 communicates with a device edge control layer 704. Cloud central control layer 702 includes power market bidding module 706, closed-loop feedback control 708, and dispatcher module 710. Cloud central control layer 702 can acquire current power price information associated with additional generation or purchase of peak power from others via the power market module 706. Based on this information, closed-loop feedback control module 708 can determine whether, how many, and which ones of a plurality of loads (such as a water heater described above, or an air conditioner or other load) should be permitted to retain local control, and which ones of that plurality of loads should be turned on or off. In order to regulate the totally aggregated power to track the reference reserve signal, a close loop feedback control logic can be used. This control structure can be essentially a predictor-corrector logical loop. The demand response power reference is compared with the actual power feedback from all controlled loads. The error (after a deadband logic to remove the uncontrollable mismatch due to the limited resolution of some types of loads) can be integrated to generate a corrector term added to the original demand response reference. The resulting adjusted power reference can then be used by the dispatcher module 710 to determine which loads are to be turned on and which loads are to be turned off.

Dispatcher module 710 operates by controlling a load based on a list, in an embodiment. Loads associated with thermal reserves that need to be heated more urgently are placed at the top of this list. When a given power reference is to be met, a pointer moves from top down until the total power equals to the reference. Every load above the pointer will be commanded to turn on, while the ones below the cutline will be commanded to turn off. An example of such a list is provided below at FIG. 11.

Within device edge control layer 704, a historian module 712 monitors, processes, and stores the power consumption pattern of individual loads. The statistical model 714 uses this dataset to conduct parameter identification, estimate the real time operating status of the load, and predict the imminent power usage. The load statistical model 714 uses this information to conduct parameter identification, estimate the real-time operating status of the various loads, and, as a result, to predict imminent power usage (e.g., over the next few minutes to the next several hours). These data are sent to a real-time control module 716. Historian module 712 can, for example, track power usage and "forget" past usage at a predefined rate, such as with an inverse exponential (i.e., old data can be multiplied by a coefficient between 0 and 1 with each new set of collected data). The "historian" function records the real time operation data at every time step and save them in a historical data file. This dataset is useful for parameter identification, reserve capacity estimation, and energy usage forecast. In a commercial application, this data can also be used to evaluate the participation of the EWH and calculate the incentive to the owner.

At the edge level, the load statistical model 714 improves upon conventional systems by using the recorded historical data from historian module 712 to learn the usage pattern of the corresponding individual load. In this way, direct observability of the load may not be required in order to generate an accurate overall model of the effects that a demand response event will have on each load. For an electric water heater, for example, this statistical model allows one to estimate the hot water usage at any given time on a given day. This information can be used to 1) predict the thermal reserve from the load in the next hours for the central Demand Response control to bid in power market and to coordinate all loads based on their capacity; and 2) estimate the present water temperature in the tank (without attaching a thermal sensor) so the central control command can be overridden when the temperature is out of range to avoid cold shower scenario.

Similar benefits are present for other types of thermal loads, such as air conditioners. For an air conditioner, this statistical model learns the customer setting profile over the day and the critical parameters of the house thermal model. Again, such information can be used to predict the thermal reserve for the central control to bid and to coordinate all loads.

Cloud central control layer 702 receives information regarding usage via datastream 718. Based upon the determination of the closed-loop feedback control module 708, the dispatcher module 710 sends commands 720 to the device edge control layer 704. Based upon commands 720, real-time control module 716 can be used to shut off or turn on the heat to a load.

The close-loop feedback control 708 and the dispatcher logic 710 can operate in conjunction with one another to provide benefits over conventional demand response systems. The close loop feedback control continuously regulates the total power consumption from all participating loads to track a given reference. This accurate controllability paves the path for high-value grid services such as frequency regulation and ramping reserve.

The dispatcher logic of the real-time control module 716 ranks participating loads based on their thermal reserve capacity and improves coordination of the loads. Loads with higher "urgency" (i.e., cold water heaters or hot air conditioned spaces) will be released to resume their local control first while loads with higher flexibility will be turned off by the system 700.

In one embodiment involving a water heater, the real-time control module 716 can provide a signal that is based upon the type of water heater. For example, control design concept 700 can include observability of three particular types of water heaters having no, one, or two temperature sensors, as described with respect to FIG. 5. As described above, temperature sensors can be used to detect the temperature at various points in the temperature strata within the water tank. However, in some cases, the data measured by these sensors cannot be acquired by a utility. Therefore, the model used as the basis of the design concept 700 must be created on the assumption that there are no sensors within that particular tank. Other embodiments may have one accessible temperature sensor, and others may have two. In theory there could be any number of accessible sensors, and a model could be adjusted to include data from each.

In addition to different observability of the sensors, there may also be different levels of controllability. For example, some water heaters may permit turning on or off of the power supply to the heaters, whereas others may permit more complex control such as controlling the lower heating element in isolation, or full control of both upper and lower heating elements.

Figure 8:
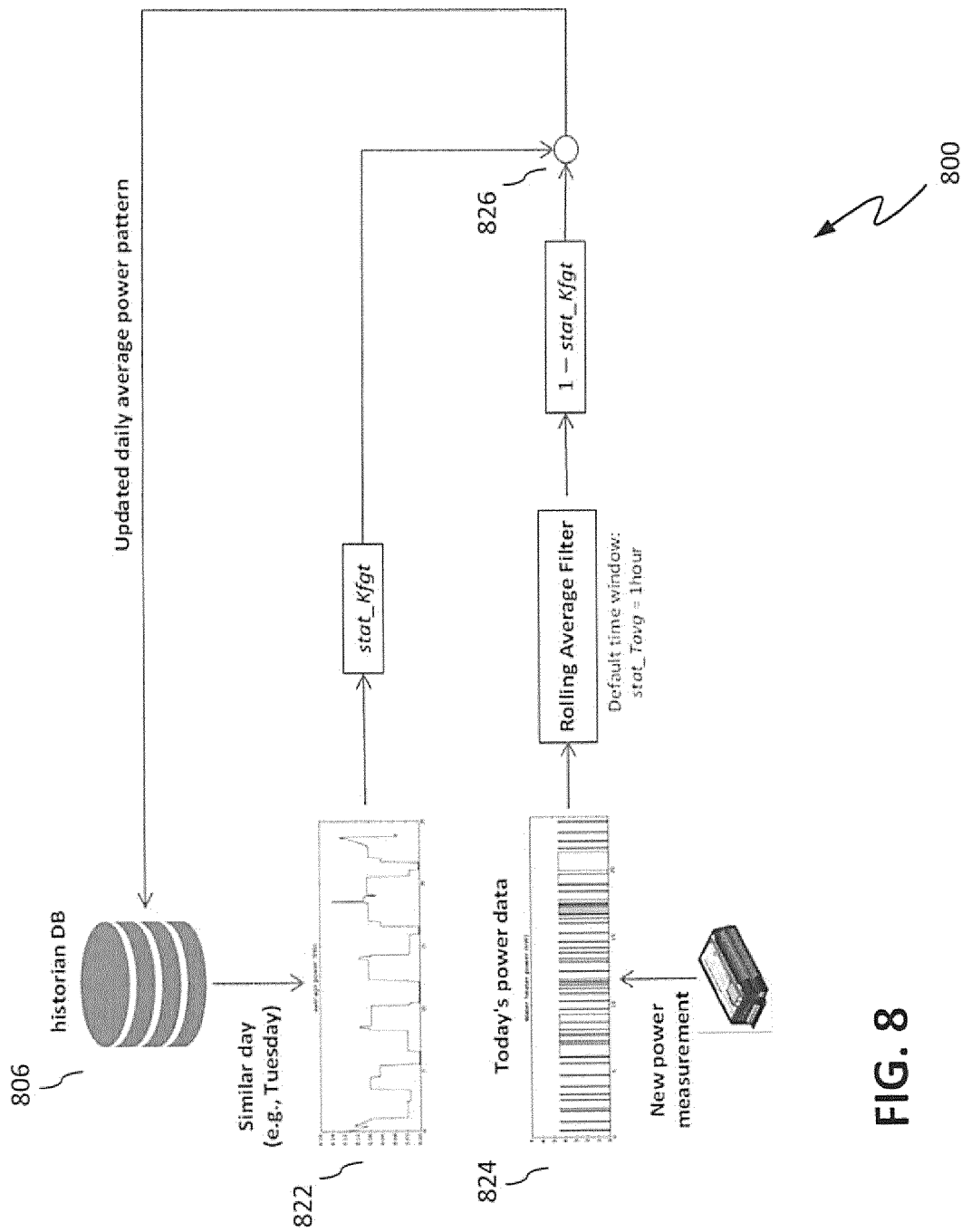
FIG. 8 is a schematic view of the statistics function, according to an embodiment.

FIG. 8 shows the statistics function in more detail (e.g., the application of data from historian module 712 to load statistical module 714 in FIG. 7). As shown in FIG. 8, the historian database 806 outputs data 822 from a similar day, which could be based on the same day of the week or the same temperature outside, among other factors. The factors that determine similarity can be based upon the type of load under consideration. For example, weekend vs. weekday hot water usage can be quite different from one another for a water heater, but not as much for an air conditioner. For an air conditioner load, the similarity between days could instead be based upon the cloud cover, outside temperature, humidity, etc.

The similar day data 822 is weighted against same-day power measurements 824 that have gone through a rolling average filter, at combination point 826. It should be understood that combination point 826 is not necessarily a physical combination point, but could instead be an end result of a calculation within a processor. From combination point, the updated daily average power pattern is fed back to the historian database 806 for use in future modeling.

Figure 9:
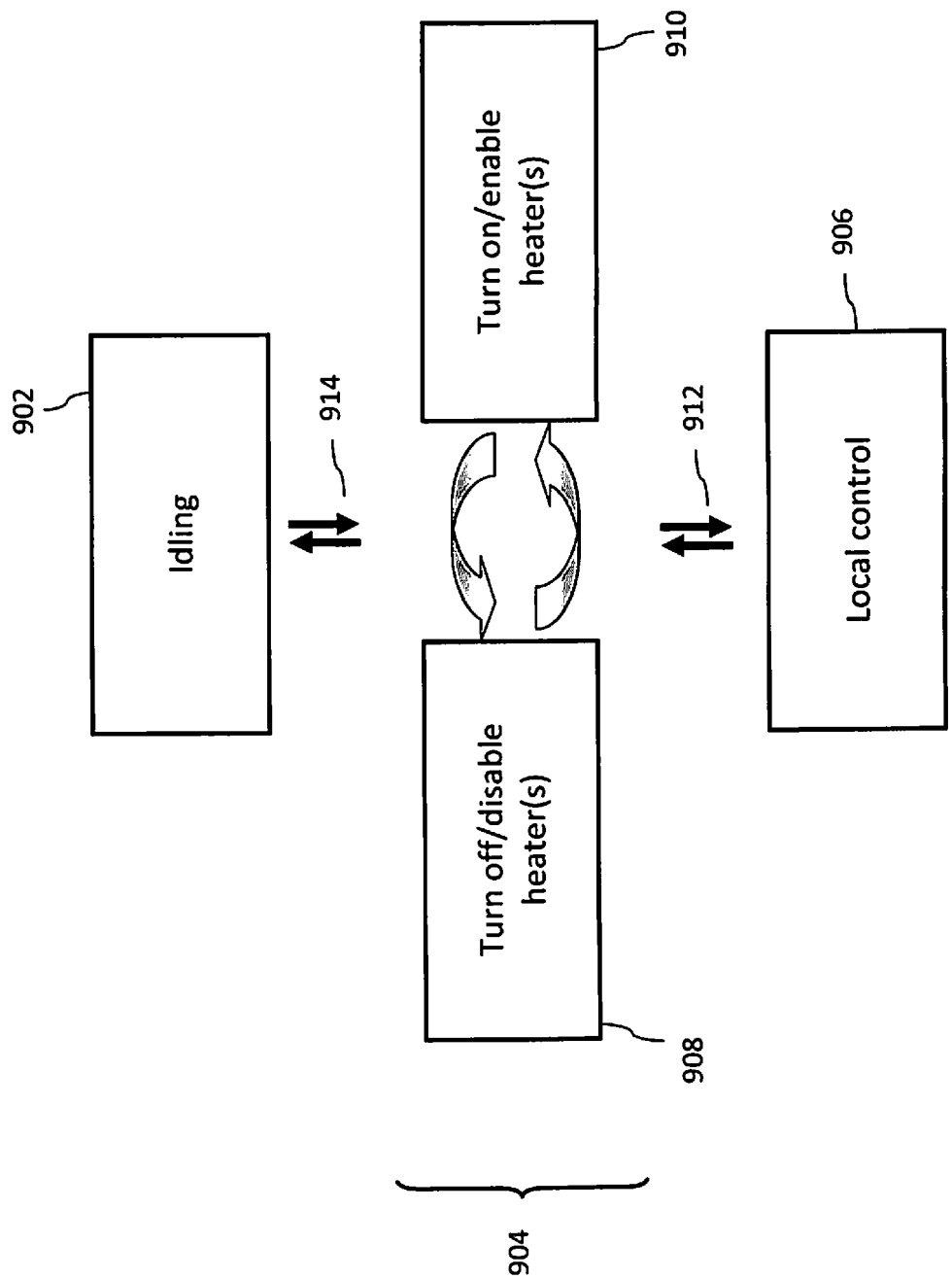
FIG. 9 is a schematic diagram of a system for control of an individual load, according to an embodiment.

FIG. 9 depicts a system 900 for operating a water heater according to an embodiment. In normal operating conditions, when no demand response request has been made by a utility, the system 900 is in a condition of idling 902. Idling does not necessarily mean that the heaters are off; rather, 'idling' refers to the state in which the water heater's own control takes action and determines whether it should heat or not independently (most likely based upon a temperature reading or readings).

At 914, demand response is triggered. The arrows at 914 point in both directions, because demand response commands from a utility or other centralized source can be activated or deactivated. When deactivated (or in the absence of activation of a demand response condition), the water heater will return to an idling condition 902. During the demand response condition, modified operation states 904 can be implemented.

Within modified operation states 904, heaters can be turned off (908) or turned on (910). The factors used by system 900 to determine which of these two should apply depend on the type of demand response requested. For example, system 900 can implement modified states 904 based upon an "up reserve" state, in which heaters are turned off to reduce total power draw within the system. Conversely, system 900 can implement a modified state 904 based upon a "down reserve" state, in which heaters are turned on to increase total power draw within the system. Using both of these states across many water heaters can smooth and reduce the peak of power grids.

Local control 906 can be implemented based upon several factors. Local control 906 is similar to idling, except that it occurs during a demand response condition when the water heater is receiving a signal requesting a particular type of modified state (904). Local control 906 is an "opt out" of performing this requested functionality because, for example, the water temperature within a water heater exceeds a threshold high value or alternatively it is below a threshold low value. The opt-out, local control 906 state can be terminated when the temperature within the water tank is back within the desired temperature range. Additionally, to prevent rapid cycling between opting in (904) and opting out (906), an opt-out timer can be implemented, by which local control 906 is maintained for at least some minimum amount of time.

Figure 10:
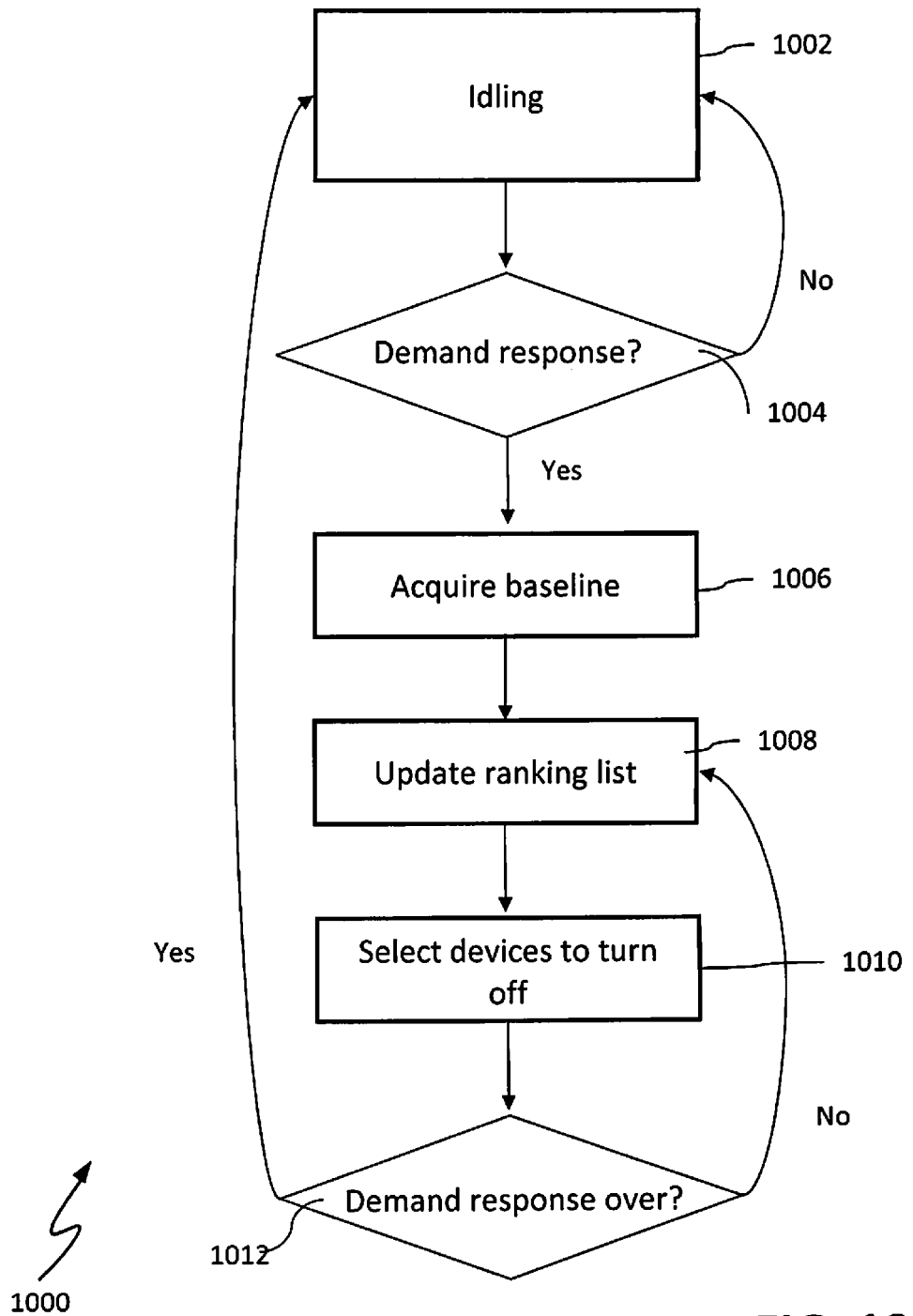
FIG. 10 is a method flowchart corresponding to a system for control of a network of loads, according to an embodiment.

FIG. 10 is a flowchart depicting a method 1000 for implementing a demand response system at the cloud level, according to an embodiment. Importantly, method 1000 is for a system of loads, and not for an individual device. As shown in FIG. 10, method 1000 begins with an idling system at 1002. At 1004, the method 1000 includes determining whether a demand response event is warranted. The demand response event can be based upon a determination that overall demand is high, or that the ramp rate of electrical demand is high. At 1006, if a demand response condition is warranted, then a baseline is acquired. At 1008, a ranking list is updated or created. In these two elements of the method 1000, electrical loads are compared to determine which ones can be shut off without significantly affecting customers. The baseline acquired at 1006 is useful because it provides information on the existing state of the load (e.g., water temperature in a water tank, or air temperature in an air-conditioned space). The ranking at 1008 can be based upon several factors, including whether the electrical load is currently on, what the current temperature of the thermal reserve associated with that electrical load is compared to its set point, how long it has been since the electrical load has last been provided with a demand-response command, and whether the electrical load is in an "opt-out" mode (e.g., 906 of FIG. 9). The following illustrates one exemplar set of rules for calculating the ranking scores:

Rule 1: For every 5F that the water temperature is below 130F, add 0.1 point

Rule 2: Find the maximum value of all available down reserve energy, use this value as the per-unit base, and calculate the score of each EWH as "av1_eng_dn"/"max_av1_eng_dn"

Rule 3: If an EWH is already on, add 0.5 point

Figure 11:
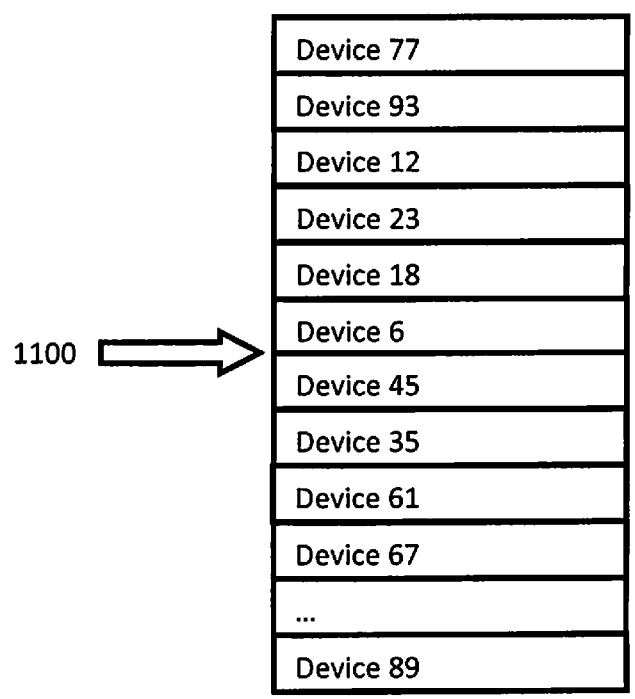
FIG. 11 depicts a ranking system for selective shutdown of a set of loads, according to an embodiment.

Rule 4: If an EWH has not been engaged in a turn-on command for at least "switch dly" time, add 0.5 point Rule 5: If an EWH is in "opt out" mode, minus 10 points Based upon these rankings, and as shown in FIG. 11, the electrical loads are ranked. The lowest-ranked devices are those which have not been subjected to demand response lately, are not in opt-out mode, and (based on a predictive model as described in device edge control layer 704 of FIG. 7) are likely not to be out of a desired temperature band. The devices below pointer 1100 of FIG. 11 are those devices that can be turned off while causing relatively little disruption to the lives of customers. It should be understood that in alternative embodiments, different rules and weighting mechanisms can be used to determine the rankings of the various loads.

Returning to FIG. 10, at 1010 the devices that should be turned off are selected. As shown in FIG. 11, these devices would be the ones above the pointer 1100. However, as previously described with respect to FIG. 9, in some cases the demand response module may in fact request that a device be turned on, rather than turned off, at 1008. In this way, the slope of the demand curve can be reduced when organic overall demand is expected to significantly increase in the near term. Furthermore, implementing a demand response system in which a device is required to turn on early uses the thermal reserve of the system to store energy throughout the peak demand time, since hot water or air-conditioned spaces will maintain the benefits of having been pre-conditioned past their set points for at least some time.

It should be understood that the specific embodiments described herein relate primarily to water heaters and air conditioners, but similar systems could be implemented based on any other system that can store power, in particular thermal reserves or other storage systems that can be pre-conditioned to smooth the demand curve. Similar systems could be used that are based on the charging times or rates of electric vehicles, for example. Heating, Ventilation, and Air Conditioning (HVAC) systems can provide still further demand response functionality since they consume even higher levels of power than water heaters, though there can be large variation in thermal characteristics, and load consumption is highly dependent on weather and user setpoints.

Various software systems can be implemented to control the thermal reserves corresponding to electrical loads that fall within the scope of this invention. For example, an HVAC or water heater control system can be connected to a wired or wireless network that permits access to the control system from a server or cloud in some embodiments. In these embodiments, the temperature and voltage set points for the system can be controlled, either by the user of the hot water or by the utility that operates the electrical grid. Firmware can be used to add timers, counters, delays, and/or other parameters and features to modify the functionality of the heater. These parameters can include the over voltage level, the normal voltage level, the normal voltage temperature settings, and the over voltage temperature settings. In embodiments having such software, the controller can include a processor, antenna, and/or other features necessary to communicate with a mobile device, wired or wireless network, or smartphone.

The systems and methods of operating them described above can result in benefits to both the user of the hot water and the utility company. These benefits include reduced power prices, increased capacity to add DER power sources to the grid, and reduction of the inconvenience of conventional demand response systems. As use of such systems increases, their ability to store excess power and their ability to smooth the overall power usage on the grid increases, increasing their value to utilities and customers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for managing electrical demand corresponding to a plurality of electrical loads and a power generation source each coupled to a power grid, wherein each of the plurality of electrical loads is coupled to a corresponding thermal reserve such that operation of the electrical load increases the corresponding thermal reserve, the system comprising:
 a controller arranged at a first one of the plurality of electrical loads, the controller configured to:
  store past power usage of the first one of the plurality of electrical loads,
  generate a device model based upon the past power usage of the first one of the plurality of electrical loads and the corresponding thermal reserve, and predict a future thermal reserve of the first one of the plurality of electrical loads based on the device model,
  send the future thermal reserve to a centralized control,
  receive a demand response signal based on the future thermal reserve from the centralized control, and
  selectively turn the first one of the plurality of electrical loads on or off based on the demand response signal.

2. The system of claim 1, further comprising the centralized control, and wherein the centralized control is configured to
 rank the plurality of electrical loads as a function of the corresponding future thermal reserves, and send the demand response signal to the first one of the plurality of electrical loads based upon the ranking of the first one of the plurality of electrical loads.

3. The system of claim 2, wherein the controller is further configured to: apply a rolling average filter to power usage of the first one of the plurality of electrical loads on a first day to generate an averaged power data set; combine the averaged power data set with a historical data set corresponding to a second day to generate an updated daily average power pattern, wherein the first day and the second day have at least one factor in common; and store the updated daily average power pattern.

4. The system of claim 3, wherein the factor comprises a day of the week, and the historical data set corresponding to the second day is a data set of power consumption selected according to the day of the week.

5. The system of claim 3, wherein the factor comprises one or more of temperature, humidity, and cloud cover, and the historical data set corresponding to the second day is a data set of power consumption selected based on one or more of temperature, humidity, and cloud cover on the second day.

6. The system of claim 2, wherein the first one of the plurality of electrical loads is associated with an observable thermal reserve.

7. The system of claim 6, wherein the first one of the plurality of electrical loads is a water heater and the corresponding thermal reserve is a tank of heated water having an observable temperature.

8. The system of claim 2, wherein the first one of the plurality of electrical loads is an air conditioning system and the thermal reserve is a cooled air mass having an observable temperature.

9. The system of claim 2, wherein the controller is further configured to determine an operating state of the first one of the plurality of electrical loads.

10. The system of claim 9, wherein the controller is further configured to operate the first one of the plurality of electrical loads in all of three states including an idling state, a modified operation state, and an opt-out state.

11. The system of claim 10, wherein the controller is further configured to apply an opt-out state when a thermal reserve associated with the first one of the plurality of electrical loads is not within a predefined temperature band.

12. The system of claim 2, wherein the centralized control is on a cloud platform.

13. The system of claim 2, wherein the centralized control is on one of a server, a mobile device, and a utility.

14. The system of claim 2, wherein the centralized control is further configured to: acquire current power price information associated with one of additional power generation and purchase of power, and to determine which of the plurality of electrical loads to selectively turn on or off based on the current power price information.

15. The system of claim 1, wherein the first one of the plurality of electrical loads is a type of load, and the controller is further configured to provide a signal to the centralized control based on the type of load.

16. A system comprising:
a local controller arranged at a first one of a plurality of electrical loads that each have a corresponding thermal reserve, the local controller configured to:
store past power usage of the first one of the plurality of electrical loads,
generate a device model based upon the past power usage of the first one of the plurality of electrical loads and the corresponding thermal reserve,
predict a future thermal reserve of the first one of the plurality of electrical loads based on the device model,
send the future thermal reserve to a centralized control,
receive a demand response signal based on the future thermal reserve from the centralized control, and
selectively turn the first one of the plurality of electrical loads on or off based on the demand response signal.

17. The system of claim 16, wherein the centralized control is on a cloud platform.

18. The system of claim 16, wherein the centralized control is on one of a server, a mobile device, and a utility.

19. The system of claim 16, further comprising the centralized control, and wherein the centralized control is configured to rank the plurality of electrical loads as a function of one or more of predicted future thermal reserves and an urgency of the thermal reserve; and send the demand response signal to the first one of the plurality of electrical loads based upon the ranking of the first one of the plurality of electrical loads.

20. A system comprising:
a local controller arranged at a first one of a plurality of electrical loads that each have a corresponding thermal reserve, the local controller comprising:
storage means for storing past power usage of the first one of the plurality of electrical loads,
a load statistical model configured to: generate a device model based upon the past power usage of the first one of the plurality of electrical loads and the corresponding thermal reserve, and predict a future thermal reserve of the first one of the plurality of electrical loads based on the device model, and
a real-time control module configured to send the future thermal reserve to a centralized control, to receive a demand response signal based on the future thermal reserve from the centralized control, and to selectively turn the first one of the plurality of electrical loads on or off based on the demand response signal.

\* \* \* \* \*